(12) United States Patent
Knoener et al.

(10) Patent No.: US 12,128,508 B2
(45) Date of Patent: Oct. 29, 2024

(54) SYSTEMS AND METHODS FOR CONTROLLING ARC INITIATION AND TERMINATION IN A WELDING PROCESS

(71) Applicant: Illinois Tool Works Inc., Glenview, IL (US)

(72) Inventors: Craig Steven Knoener, Appleton, WI (US); Lucas Charles Johnson, Appleton, WI (US); Zach W. MacMullen, Larsen, WI (US); Charles Ace Tyler, Neenah, WI (US); Christine Dong, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 834 days.

(21) Appl. No.: 16/653,567

(22) Filed: Oct. 15, 2019

(65) Prior Publication Data

US 2020/0122260 A1 Apr. 23, 2020

Related U.S. Application Data

(60) Provisional application No. 62/748,590, filed on Oct. 22, 2018.

(51) Int. Cl.
*B23K 9/09* (2006.01)
*B23K 9/067* (2006.01)
(Continued)

(52) U.S. Cl.
CPC ............ *B23K 9/0673* (2013.01); *B23K 9/092* (2013.01); *B23K 9/093* (2013.01); *B23K 9/0953* (2013.01); *B23K 9/1062* (2013.01)

(58) Field of Classification Search
CPC .......... B23K 9/09; B23K 9/092; B23K 9/095; B23K 9/0953; B23K 9/0956; B23K 9/0673; B23K 9/10; B23K 9/1056; B23K 9/1062

See application file for complete search history.

(56) References Cited

U.S. PATENT DOCUMENTS

| | | | | |
|---|---|---|---|---|
| 3,487,195 A | * | 12/1969 | Darees | B23K 9/007 219/127 |
| 3,781,511 A | * | 12/1973 | Rygiol | B23K 9/092 219/137 R |

(Continued)

FOREIGN PATENT DOCUMENTS

| CN | 102950364 A | 3/2013 |
|---|---|---|
| CN | 105750695 A | 7/2016 |

(Continued)

*Primary Examiner* — Thien S Tran
(74) *Attorney, Agent, or Firm* — McAndrews, Held & Malloy, Ltd.

(57) ABSTRACT

Systems and methods for initiating and/or terminating a GMAW-P welding process are disclosed. A welding-type power supply may include a power conversion circuitry configured to convert input power to welding-type power, and a controller configured to control the power conversion circuitry based on a plurality of operating parameters. In examples, the systems and methods disclosed herein implement pulsed cycles with one or more increased output parameters (such as current, pulse width, etc.) in order to jump start a pulsed welding cycle at a cold start (i.e. at initiation of a welding process), and thereby prevent a ball forming and remaining on the end of an electrode wire as the welding process continues. In a similar manner, a pulsed cycle with one or more increased parameters can be used to terminate the welding process, also preventing the ball forming and remaining on the electrode wire.

20 Claims, 4 Drawing Sheets

(51) Int. Cl.
 *B23K 9/095* (2006.01)
 *B23K 9/10* (2006.01)

(56) References Cited

U.S. PATENT DOCUMENTS

| | | | | |
|---|---|---|---|---|
| 5,317,116 A * | 5/1994 | Tabata | G05F 1/08 | 219/130.51 |
| 5,473,139 A * | 12/1995 | Matsui | B23K 9/092 | 219/130.51 |
| 6,365,874 B1 * | 4/2002 | Stava | B23K 9/1075 | 219/130.33 |
| 8,373,093 B2 * | 2/2013 | Peters | B23K 9/092 | 219/130.21 |
| 9,550,248 B2 * | 1/2017 | Hearn | B23K 9/125 | |
| 2004/0232129 A1 * | 11/2004 | Houston | B23K 9/1043 | 219/130.51 |
| 2007/0056944 A1 * | 3/2007 | Artelsmair | B23K 9/092 | 219/130.5 |
| 2007/0102408 A1 * | 5/2007 | Peters | B23K 9/1062 | 219/130.51 |
| 2007/0246448 A1 * | 10/2007 | Nishisaka | B23K 9/092 | 219/130.51 |
| 2008/0006612 A1 * | 1/2008 | Peters | B23K 9/0738 | 219/76.14 |
| 2008/0210545 A1 * | 9/2008 | Kouznetsov | H01J 37/3467 | 204/192.12 |
| 2008/0264923 A1 * | 10/2008 | White | B23K 9/173 | 323/212 |
| 2009/0242533 A1 * | 10/2009 | Yamazaki | B23K 9/0956 | 219/130.32 |
| 2009/0321401 A1 | 12/2009 | Peters | | |
| 2010/0308027 A1 * | 12/2010 | Vogel | B23K 9/0953 | 219/130.21 |
| 2013/0015170 A1 * | 1/2013 | Peters | B23K 9/092 | 219/130.21 |
| 2013/0112675 A1 * | 5/2013 | Peters | B23K 9/0953 | 219/130.51 |
| 2013/0262000 A1 * | 10/2013 | Hutchison | B23K 9/0953 | 702/58 |
| 2014/0008342 A1 * | 1/2014 | Peters | B23K 9/0956 | 219/130.21 |
| 2014/0027423 A1 * | 1/2014 | Takada | H05B 1/0202 | 219/130.01 |
| 2014/0131320 A1 * | 5/2014 | Hearn | B23K 9/173 | 219/74 |
| 2014/0367370 A1 * | 12/2014 | Hutchison | B23K 9/1062 | 219/130.33 |
| 2015/0060424 A1 * | 3/2015 | Daniel | B23K 31/12 | 219/130.21 |
| 2015/0151376 A1 * | 6/2015 | Peters | B23K 9/092 | 219/130.5 |
| 2016/0175971 A1 * | 6/2016 | Denis | B23K 9/1062 | 219/137 R |
| 2017/0036292 A1 * | 2/2017 | Ide | B23K 9/0953 | |
| 2017/0050255 A1 * | 2/2017 | Davidson | B23K 9/091 | |
| 2017/0120366 A1 * | 5/2017 | Zucker | B23K 9/0953 | |
| 2017/0165778 A1 * | 6/2017 | Hsu | B23K 9/24 | |
| 2017/0225253 A1 * | 8/2017 | Matsuoka | B23K 9/095 | |
| 2018/0214968 A1 * | 8/2018 | Peters | B23K 9/092 | |
| 2018/0214969 A1 * | 8/2018 | Fleming | B23K 9/173 | |
| 2018/0367050 A1 * | 12/2018 | Mnich | B23K 9/0956 | |
| 2019/0091789 A1 * | 3/2019 | Peters | B23K 9/091 | |
| 2019/0160577 A1 * | 5/2019 | Guymon | B23K 9/1087 | |
| 2020/0055135 A1 * | 2/2020 | Takada | B23K 9/09 | |

FOREIGN PATENT DOCUMENTS

| | | |
|---|---|---|
| CN | 107000098 A | 8/2017 |
| JP | S57187175 A | 11/1982 |
| JP | S57187178 A | 11/1982 |
| JP | 3074765 B2 * | 8/2000 |
| KR | 830009883 A | 12/1983 |

\* cited by examiner

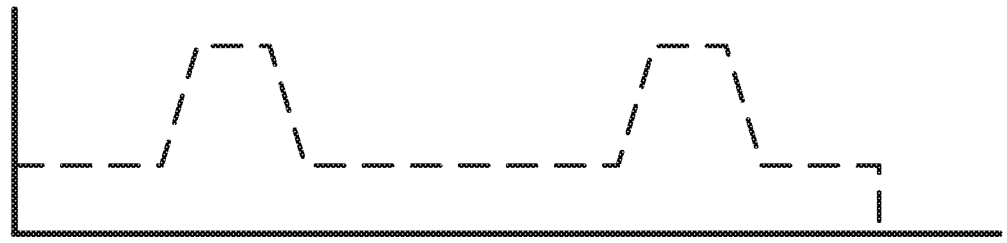
VOLTAGE  FIG. 2A
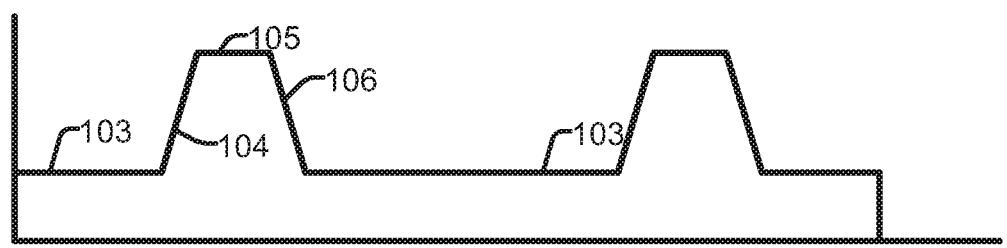
CURRENT  FIG. 2B
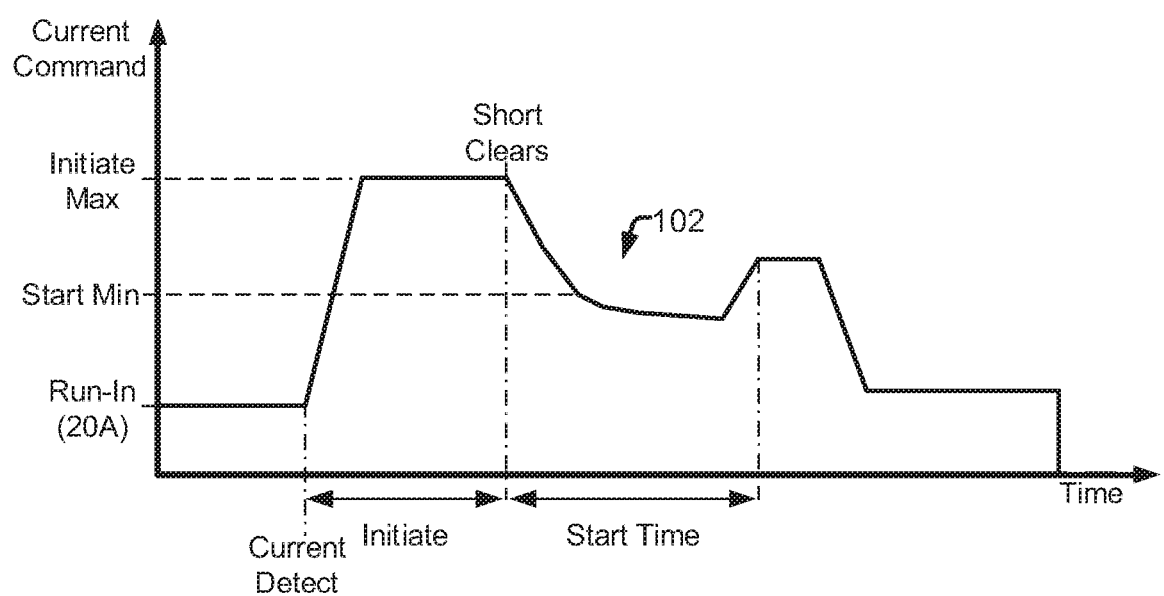
FIG. 3

SYSTEMS AND METHODS FOR CONTROLLING ARC INITIATION AND TERMINATION IN A WELDING PROCESS

RELATED APPLICATIONS

This patent claims priority to U.S. Provisional Patent Application Ser. No. 62/748,590, filed Oct. 19, 2018, entitled "Systems and Methods for Controlling Arc Initiation and Termination in a Welding Process." The entirety of U.S. Provisional Patent Application Ser. No. 62/748,590 is incorporated herein by reference.

TECHNICAL FIELD

This disclosure relates generally to welding-type power supplies and, more particularly, to systems and methods for auto-tuning a pulsed gas metal arc welding (GMAW) process.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

One known welding process is a pulsed metal inert gas (MIG) process. A pulsed MIG process typically has a cyclical output having at least a peak portion with a relatively high current and a background portion with a relatively low current. There is often an abrupt change in slope from the beginning and end of the peak and background portions.

SUMMARY

The present disclosure is directed to systems and methods to control pulse welding, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 2A shows a voltage waveform of a pulsed welding cycle in accordance with aspects of this disclosure.

FIG. 2B shows a current waveform of a pulsed welding cycle in accordance with aspects of this disclosure.

FIG. 3 shows a weld current waveform in accordance with aspects of this disclosure.

The figures are not to scale. Where appropriate, the same or similar reference numerals are used in the figures to refer to similar or identical elements.

DETAILED DESCRIPTION

Figure 1:
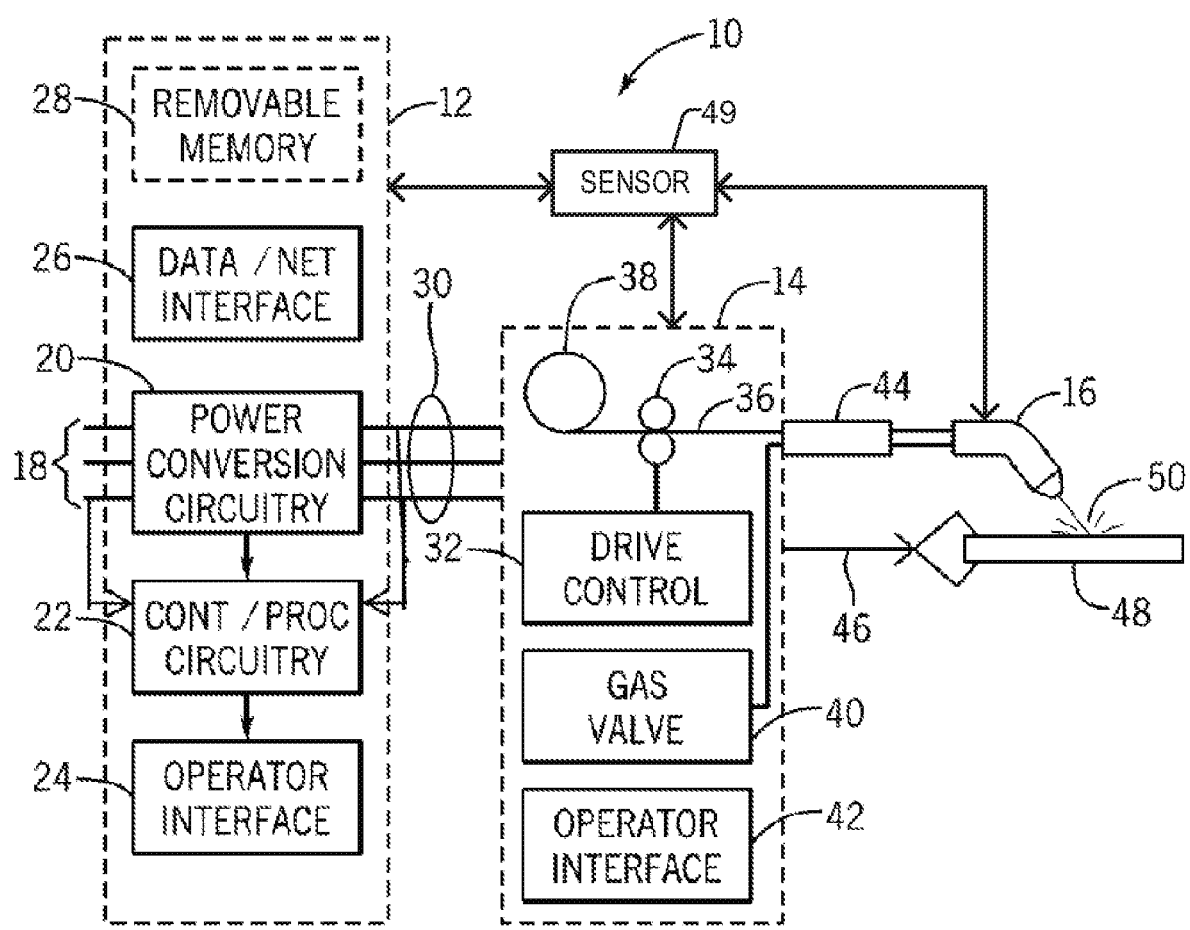
FIG. 1 is a diagram of an example welding-type system in accordance with aspects of this disclosure.

Pulse welding, as used herein, includes welding with output power that is generally pulsed, at a controllable frequency, between a greater peak and a lesser background, and pulse welding is performed in an arc state. Occasional, inadvertent shorts may occur, but the process is generally in an arc state. Welding cycle (or pulse cycle), as used herein, is comprised of multiple states of at least a peak current state, followed by a decreasing transitional state, followed by a background current state with a current value lower than the peak current, followed by an increasing transitional state. Welding cycles are typically on the order of milliseconds or tens of milliseconds. Welding cycles can include other portions as well, and a controller can use a state-based control scheme where, under certain circumstance, the typical order (peak, down, background, up) is modified.

As disclosed herein, controls for a pulsed GMAW (GMAW-P) process can be modified for significant improvements over conventional pulsed welding processes. In some examples, the systems and methods disclosed herein implement pulsed cycles with one or more increased output parameters (such as current, pulse width, etc.) in order to jump-start a pulsed welding cycle at a cold start (i.e. at initiation of a welding process), and thereby prevent a ball forming and remaining on the end of an electrode wire as the welding process continues. In a similar manner, a pulsed cycle with one or more increased parameters can be used to terminate the welding process, also preventing the ball forming and remaining on the electrode wire.

With improvements to conventional pulsed GMAW weld current controls, the average current and voltage can be reduced. Although advantageous in some respects, as the pulsed welding cycle operates at lower current and voltage levels, desired welding operating parameters may run too "cold" (e.g., too little current and/or energy) at the start of the welding cycle. Therefore, during the first few pulses of the pulsed welding cycle, a ball formed at the end of an electrode wire may not detach from the wire. This could result in a very large ball growing back to a tip of the welding torch, potentially leading to a globular transfer, pinning the tip, or any number of counter-productive effects. Accordingly, at the initiation of a pulsed welding cycle, it is desirable to have an improved start routine to ensure ball detachment.

Thus, after a weld puddle has been established, a first pulse cycle routine is implemented to ensure the welding process continues without generating a massive ball at the end of the wire. For example, the first pulse cycle includes a number of initial pulses generated to be "hotter" than the pulses for a second pulse cycle associated with an ongoing pulse welding cycle. For instance, the "hotter" pulses of the first pulse cycle can have a first peak current greater than a second peak current associated with an ongoing pulsed welding routine (see, e.g., FIG. 4). In some examples, a first pulse width associated with the first pulse cycle is greater than a second pulse width associated with the second pulse cycle of the ongoing pulse welding cycle.

Conversely, as the welding sequence is commanded to end, during the final pulse, the ball may not detach from the electrode wire. This could result in a very large ball at the end of the wire, which can result in a poor start to the next weld. Accordingly, at the termination of a pulsed welding cycle, it is desirable to have an improved termination routine to ensure ball detachment.

For instance, during an ongoing pulsed welding cycle (e.g., the second pulse welding cycle), the weld sequence may be commanded to end. At that stage, the controller transitions to a third pulse termination cycle. For example, the sequence can terminate the arc by application of one or more "hot" pulses (e.g., with an increase peak current, greater pulse width, etc.).

Thus, an improved GMAW transfer process configured to facilitate electrode ball detachment during both an initiation and/or termination stages of a pulsed GMAW welding process is desirable.

Examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating. As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding-type systems include: power conversion circuitry configured to convert input power to welding-type power; and control circuitry configured to control the power conversion circuitry to output the welding-type power in a plurality of pulse cycles, each pulse cycle comprising a background portion, a ramp up portion, a peak portion, and a ramp down portion. The controlling the power conversion circuitry includes: commanding the power conversion circuitry to initiate a welding process by outputting the welding-type power as a first pulse cycle of the plurality of pulse cycles, wherein the first pulse cycle comprising a first peak current, a first pulse width, or a combination of both; and commanding the power conversion circuitry to output the welding-type power as a second pulse cycle of the plurality of pulse cycles, wherein the first pulse cycle comprises a second peak current, a second pulse width, or a combination of both, wherein the first peak current is greater than the second peak current, and the first pulse width is greater than the second pulse width.

In some examples, wherein the control circuitry is further configured to control the power conversion circuitry to initiate the welding process by outputting the welding-type power as the first pulse cycle following clearance of a short circuit. In disclosed examples, the control circuitry is configured to command the power conversion circuitry to transition from the first pulse cycle to the second pulse cycle after a predetermined duration.

In some examples, the control circuitry is configured to command the power conversion circuitry to transition from the first pulse cycle to the second pulse cycle after a predetermined number of pulses. In disclosed examples, the control circuitry is configured to monitor one or more output power parameters of the welding-type power during the first pulse cycle; and command the power conversion circuitry to output the welding-type power as the second pulse cycle based on the one or more output power parameters. In some examples, the one or more output parameters comprises a duration, a voltage, a current, or a temperature.

In some examples, the first pulse cycle comprises a first frequency, a first background voltage and a first background current, and wherein the second pulse cycle comprises a second frequency different from the first frequency, a second background voltage different from the first background voltage, and a second background current different from the first background current.

In disclosed examples, the control circuitry is configured to command the power conversion circuitry to terminate the welding process by transitioning the welding-type power from the second pulse cycle to a third pulse cycle of the plurality of pulse cycles, wherein the third pulse cycle comprises a third peak current, a third pulse width, or a combination of both. In some examples, the third peak current is greater than the second peak current, and the third pulse width is greater than the second pulse width.

In disclosed examples, the control circuitry is configured to command the power conversion circuitry to discontinue output of the welding-type power after a predetermined duration of outputting the welding-type power as the third pulse cycle.

In some examples, the control circuitry is configured to wherein the third pulse cycle comprises a third frequency different from the second frequency, a third background voltage different from the second background voltage, and a third background current different from the second background current.

Disclosed example methods for pulse welding involve: controlling, via control circuitry, power conversion circuitry to convert input power to output welding-type power in a plurality of pulse cycles, each pulse cycle comprising a background portion, a ramp up portion, a peak portion, and a ramp down portion, wherein the controlling the power conversion circuitry includes: commanding the power conversion circuitry to initiate a welding process by outputting the welding-type power as a first pulse cycle of the plurality of pulse cycles, wherein the first pulse cycle comprising a first peak current, a first pulse width, or a combination of both; and commanding the power conversion circuitry to output the welding-type power as a second pulse cycle of the plurality of pulse cycles, wherein the first pulse cycle comprises a second peak current, a second pulse width, or a combination of both.

In some examples, the method includes: commanding the power conversion circuitry to terminate the welding process by transitioning the welding-type power from the second pulse cycle to a third pulse cycle of the plurality of pulse cycles, wherein the third pulse cycle comprises a third peak current, a third pulse width, or a combination of both.

In some examples, the method includes commanding the power conversion circuitry to discontinue output of the welding-type power after a predetermined duration of outputting the welding-type power as the third pulse cycle.

In examples, the first pulse width is greater than the second pulse width. In some examples, the method includes transitioning from the first pulse cycle to the second pulse cycle after a predetermined duration.

In some examples, the method includes transitioning from the first pulse cycle to the second pulse cycle after a predetermined number of pulses. In examples, the method includes monitoring one or more output power parameters of the welding-type power during the first pulse cycle; and commanding the power conversion circuitry to output the welding-type power as the second pulse cycle based on the one or more output power parameters.

In some examples, the one or more output parameters comprises a duration, a voltage, a current, or a temperature. In examples, the method includes commanding the power conversion circuitry to initiate the welding process by outputting the welding-type power as the first pulse cycle following clearance of a short circuit FIG. 1 is a diagram of an example welding-type system 10 in accordance with aspects of this disclosure. The example welding-type system 10 is a GMAW (gas metal arc welding) system, and in particular a MIG welding system. However, the example system 10 may perform flux cored arc welding (FCAW) and/or other wire-fed weld processes. In the example of FIG. 1, the system 10 includes a power supply 12 configured to receive and convert input power to welding-type power, which is output to a wire feeder 14. The wire feeder delivers the power to a welding torch 16 to perform a welding operation.

The power supply 12 receives input power 18 from any suitable source, such as the power grid, an engine-generator set, hybrid power supplies, fuel cells, batteries, and/or any combination of these input power sources and/or other power sources. Power conversion circuitry 20 converts the input power 18 to welding-type power. The power supply 12 may be designed to carry out multiple different welding processes that can be selected by an operator, and the power conversion circuitry 20 includes components, such as solid-state switches discussed below, that allow for power conversion in accordance with the desired process.

Control circuitry 22 is coupled to the power conversion circuitry 20 and controls the operation of the power conversion circuitry during the selected process. For example, the control circuitry 22 may provide signals that regulate the conductive states of solid state switches within the power conversion circuitry to produce the desired output power, as also discussed below. In many applications, the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control circuitry 22.

The power supply 12 may further include communications circuitry that allows for communications with remote or networked components and systems, illustrated as data/network interface 26 in FIG. 1. Such communications circuitry may allow for monitoring of welding operations, logging of weld data, downloading or configuration of new processes and updates to processes, and so forth. Finally, the power supply 12 will sometimes include removable memory 28 that may be used for storing processes, process parameters, system updates, and any suitable data.

The example system 10 includes a wire feeder 14, which may be separate from and/or integrated into the power supply 12 (e.g., contained within a housing of the power supply 12). In the illustrated example, power and/or data may be transferred from the power supply 12 to the wire feeder 14 via one or more cables or cable bundles 30. The wire feeder 14 includes drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply 12 and wire feeder 14 may operate in coordination so that wire and gas resources are fed to the welding operation when power is provided for welding at the initiative of the welding operator (e.g., via a control on the torch 16).

The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

The example power conversion circuitry 20 includes an input rectifier that converts AC power to DC power, a power factor correction boost circuit that receives the rectified input and provides a boosted bus to an isolated converter. The converter may be a dual two-switch interleaved forward converter, which may include an output rectifier and an output inductor. The wire feeder 14 feeds the wire at a rate set by the user, and the control circuitry 22 causes power circuit 18 to provide an output at the current necessary for that wire feed speed, and at the desired voltage.

One or more sensors 49 can be also be included. The sensor(s) 49 may be integrated with power supply 12, wire feeder 14, and/or welding torch 16, and/or be external and configured to communicate via one or more communications channels and/or interfaces. In some examples, the sensor(s) 49 are configured to measure welding parameters (e.g., voltage, current, temperature, etc.) and/or external parameters (e.g., workpiece and/or environmental temperature, etc.).

A periodic pulsed GMAW weld current waveform and weld voltage waveform are both shown in FIGS. 2A and 2B. In some examples, a controller (e.g., control circuitry 22) commands adjustments in the weld current during the welding process, which results in changes in the weld voltage.

As shown in FIGS. 2A and 2B, four weld states are provided with reference to voltage and current waveforms. As shown in the current waveform, a background state 103, a background-to-peak transitional state 104, a peak state 105, and a peak-to-background transitional state 106 are present during a pulsed welding cycle. During the peak state 105 and the background state 103, the controller may regulate either the weld current (e.g., as a constant current pulse) or the weld voltage to generate a desired power output. During the background-to-peak transitional state 104, the controller may increase the current from a current level ($I_{BG}$) associated with the background state 103 to a current level ($I_{PEAK}$) associated with the peak state 105. For example, the increase may be by a pre-defined ramp rate, expressed in units of amperes per millisecond (A/ms). During the peak-to-background transitional state 106, the controller may decrease the current from IPEAK to IBG at a defined ramp rate, commonly in units of A/ms.

As disclosed herein, as the pulsed welding cycle operates at lower current and voltage levels, desired welding operating parameters may be run with too little current and/or energy at the start of the welding cycle. Therefore, in order to ensure a ball does not form at the end of the electrode wire, it is desirable to have an improved start routine at the initiation of a pulsed welding cycle to ensure ball detachment.

As shown in FIG. 3, GMAW-P is initiated in a GMAW starting routine until a weld puddle is established. FIG. 3 shows the weld current waveform 102 during a start-up routine (e.g., from a cold start to an ongoing pulse welding cycle). In some example welding processes, the waveform 102 would begin at a run-in current (e.g., 20 amps), and rise after detection of the current to an initiated maximum current during the initiated pulse to form a weld puddle. When the short clears, the current drops to a minimum start level for the pulsed welding process. However, as described herein, at lower current and/or voltage levels (or less frequent, more narrow pulses), particularly in the initial stages of welding, a ball formed from the electrode wire may not detach from the wire, creating issues as the welding process continues.

Figure 4:
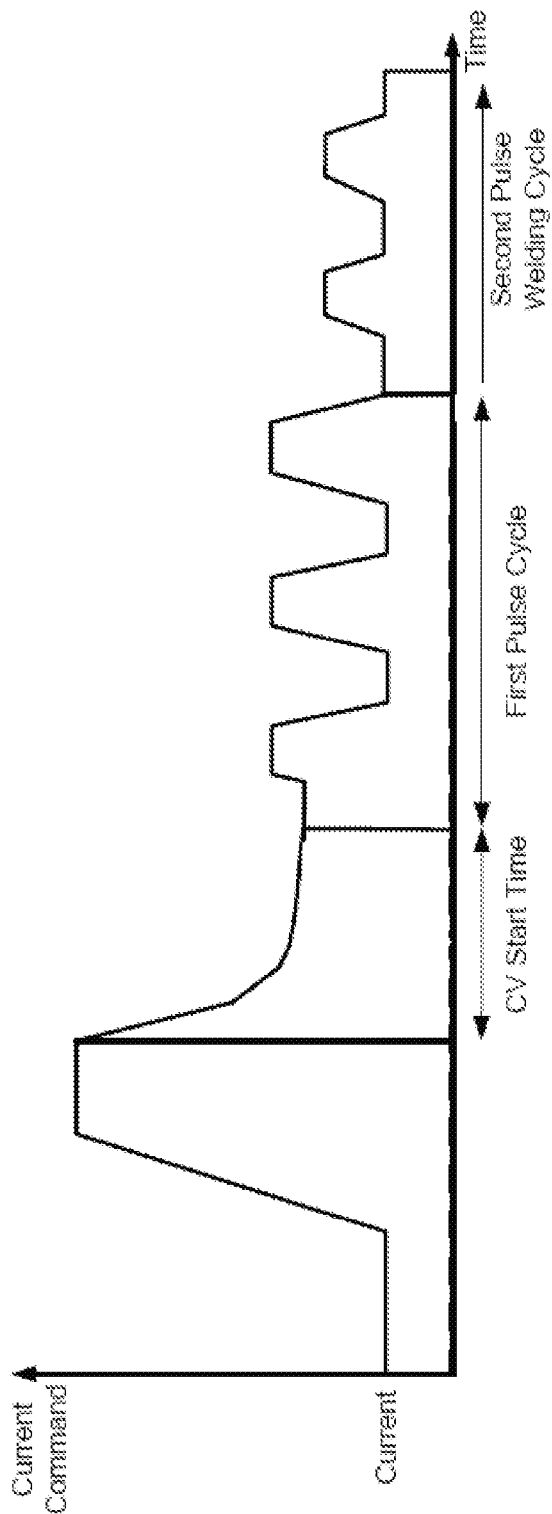
FIG. 4 shows a weld current waveform transitioning from a first pulse cycle to a second pulse cycle in accordance with aspects of this disclosure.

Thus, after a weld puddle has been established, shown in FIG. 4 as the time following the CV start time, a first pulse cycle routine is implemented to ensure the welding process continues without generating a massive ball at the end of the wire. For example, the first pulse cycle includes a number of initial pulses generated to be "hotter" than the pulses for a second pulse cycle associated with an ongoing pulse welding cycle, as shown in FIG. 4. For instance, the "hotter" pulses of the first pulse cycle can have a first peak current greater than a second peak current associated with an ongoing pulsed welding routine (see, e.g., FIG. 4). In some examples, a first pulse width associated with the first pulse cycle is greater than a second pulse width associated with the second pulse cycle of the ongoing pulse welding cycle.

Additional or alternative parameters defining the initial pulses of the first pulse cycle may include a number of pulses, a duration of each initial pulse or application of the first pulse cycle, a pulse width, a frequency, a peak current, a background current, to name a few. The parameters, as well as a start and end time for the first pulse cycle, can be determined empirically, such as by monitoring implementations and collecting data from the same, storing the data in a library or list, and/or referencing the data during initiation of a pulsed welding process. The parameters of the initial pulses may also be determined and/or calculated (e.g., based on a user input, desired welding sequence, type of workpiece material, type of wire employed, type of joint, type of welding operation, etc.).

In some examples, frequency and background voltage associated with the first pulsed cycle are not changed during application of the initial pulses (e.g., during application of the initial pulses and/or in comparison to the second pulsed cycle). Alternatively, the frequency and/or the background voltage can be changed, based on one or more of the welding parameters, for example. In some examples, the welding process would immediately begin with current controlled GMAW-P, using the higher current start pulses. In some examples, the first pulsed cycle can output power with pulses of different peak current. For instance, one or more initial pulses of the first pulsed cycle can be at a higher peak current than one or more of the following pulses. In some examples, the peak current can decrease over time, prior to transitioning to the second pulsed cycle.

In some examples, the first pulsed cycle is implemented shortly after clearance of a short circuit, and is not again implemented until after clearance of another short circuit. In some examples, the first pulsed cycle can be implemented during a welding operation where power is output as the second pulsed cycle. The first pulsed cycle can be implemented in response to detection of a short circuit condition or calculation of an anticipated short circuit condition, or clearance of a short circuit (e.g., an un-commanded short circuit during a background phase). Therefore, the control circuitry can implement the first pulsed cycle following a short circuit clearance, and implement the second pulsed cycle during the ongoing welding operation. In some examples, the first pulsed cycle may be implemented after and/or within an ongoing welding operation (e.g., after and before the second pulsed cycle) in response to a determination to apply additional power.

The welding process can be monitored (e.g., via the control circuitry 22 and/or sensor(s) 49) to validate the process. For example, if one or more parameters indicates the second pulse welding cycle has not initiated properly, the first pulse cycle routine can be re-run. Thus, the disclosed systems and methods advantageously provide an initiation routine to overcome downfalls associated with lower current and/or voltage pulsed welding processes.

Conversely, as the welding sequence is commanded to end, during the final pulse, the ball may not detach from the electrode wire. This could result in a very large ball at the end of the wire, which can result in a poor start to the next weld. Accordingly, at the termination of a pulsed welding cycle, it is desirable to have an improved termination routine to ensure ball detachment.

Figure 5:
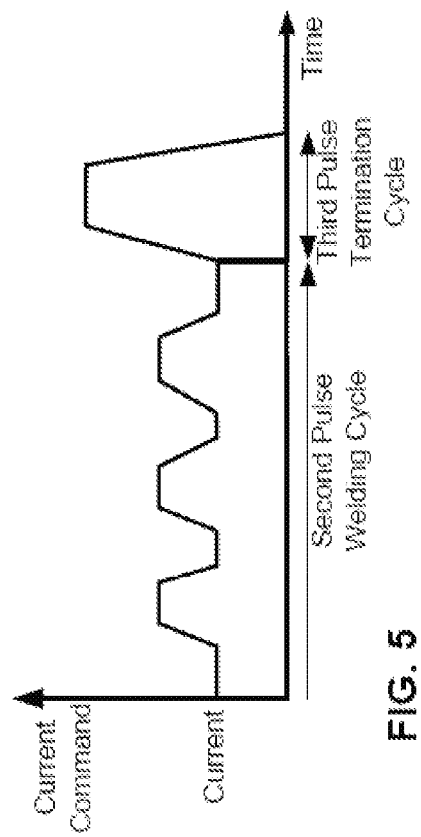
FIG. 5 shows a weld current waveform transitioning from a second pulse cycle to a third pulse cycle in accordance with aspects of this disclosure.

As shown in FIG. 5, during an ongoing pulsed welding cycle (e.g., the second pulse welding cycle), the weld sequence may be commanded to end. At that stage, the controller transitions to a third pulse termination cycle. For example, the sequence can terminate the arc by application of one or more "hot" pulses (e.g., with an increase peak current, greater pulse width, etc.).

In conventional systems, for low current and/or voltage settings, the ball at the end of the electrode wire did not reliably detach at the end of the pulsed welding cycle. For instance, if no short occurred, a burn back routine would similarly be unable to detach the ball. The result was a large ball remaining on the electrode wire, and creating issues when a welding sequence is started anew. Therefore, for the termination pulse, parameters for the third pulse cycle, such as pulse width and/or peak current, can be adjusted (e.g., increased or decreased) accordingly.

In some examples, frequency and background voltage associated with the third pulsed cycle are not changed during application of the initial pulses (e.g., during application of the initial pulses and/or in comparison to the second pulsed cycle). Alternatively, the frequency and/or the background voltage can be changed, based on one or more of the welding parameters, for example.

Figure 6:
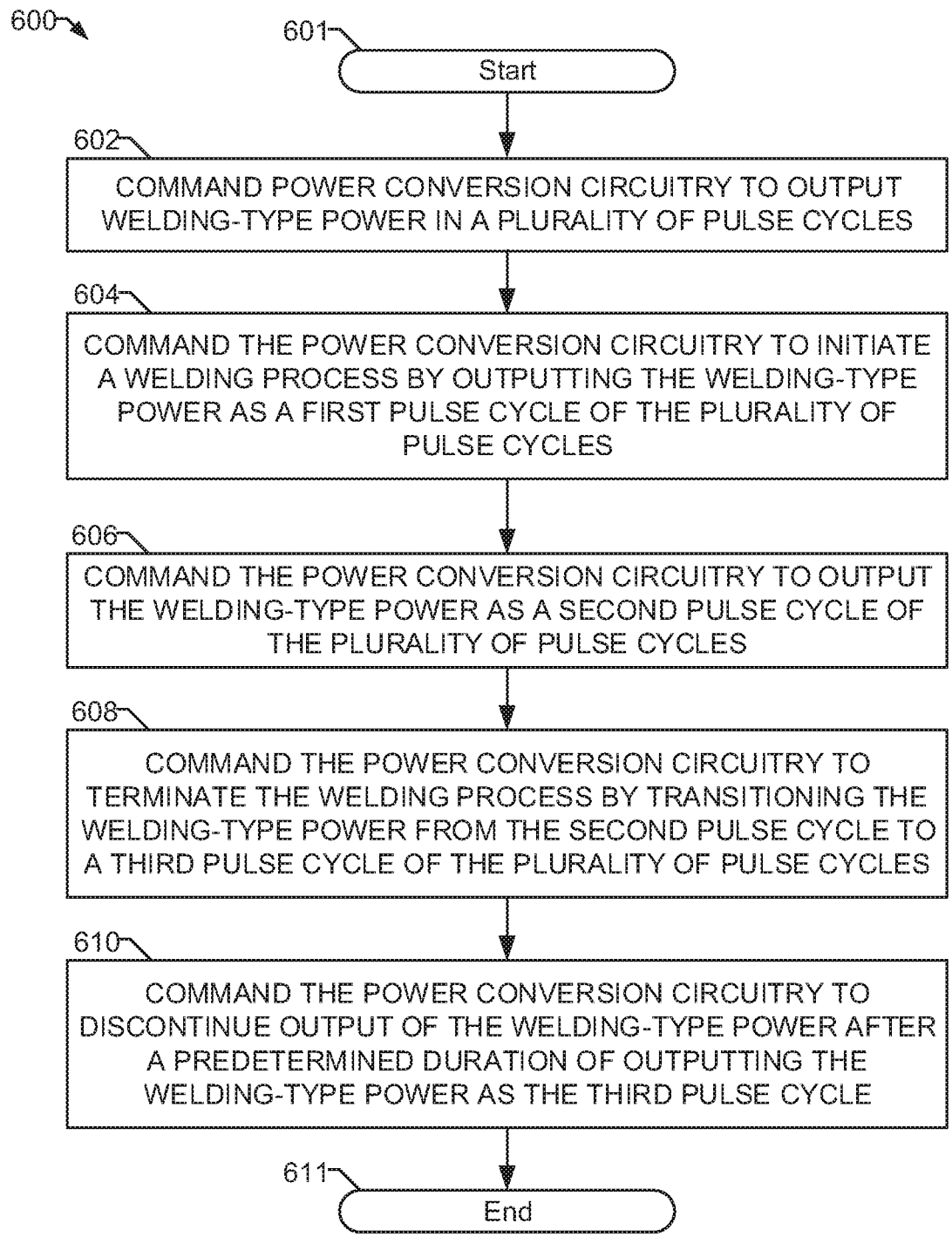
FIG. 6 is a flowchart representative of example machine readable instructions which may be executed to implement the welding-type power supply of FIG. 1 to control pulse welding in accordance with aspects of this disclosure.

FIG. 6 is a flowchart illustrating example method 600 of operating a welding-type system, for example, the welding-type system 10 of FIG. 1 to implement the waveforms of FIGS. 2A-5. The method 600 of FIG. 6 may be implemented by a controller (e.g., control circuitry 22) by executing machine-readable instructions, such as stored on a non-transitory machine-readable storage device (e.g., removable memory 28).

The method 600 starts at block 601. At block 602, the controller commands power conversion circuitry (e.g., power conversion circuitry 20) to convert input power to output welding-type power in a plurality of pulse cycles, each pulse cycle comprising a background portion, a ramp up portion, a peak portion, and a ramp down portion (e.g., as shown in FIGS. 2A-5).

At block 604 the controller commands the power conversion circuitry to initiate a welding process by outputting the welding-type power as a first pulse cycle of the plurality of pulse cycles. As shown in FIG. 4, the first pulse cycle includes a first peak current, a first pulse width, or a combination of both.

At block 606 the controller commands the power conversion circuitry to output the welding-type power as a second pulse cycle of the plurality of pulse cycles. As shown in FIG. 4, the second pulse cycle comprises a second peak current, a second pulse width, or a combination of both.

At block 608 the controller commands the power conversion circuitry to terminate the welding process by transitioning the welding-type power from the second pulse cycle to a third pulse cycle of the plurality of pulse cycles. As shown in FIG. 5, the third pulse cycle comprises a third peak current, a third pulse width, or a combination of both.

At block 610 the controller commands the power conversion circuitry to discontinue output of the welding-type power after a predetermined duration of outputting the welding-type power as the third pulse cycle. At block 611 the controller ends the pulsed welding cycle.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
   power conversion circuitry configured to convert input power to welding-type power; and
   control circuitry configured to control the power conversion circuitry to output the welding-type power in a plurality of pulse cycles, each pulse cycle comprising a background portion, a ramp up portion, a peak portion, and a ramp down portion at a given polarity, wherein the controlling the power conversion circuitry comprises:
      commanding the power conversion circuitry to initiate a welding process by outputting the welding-type power as a first pulse cycle of the plurality of pulse cycles, wherein the first pulse cycle comprises a first peak current, a first pulse width, or a combination of both;
      commanding the power conversion circuitry to output the welding-type power as a second pulse cycle of the plurality of pulse cycles, wherein the second pulse cycle comprises a second peak current, a second pulse width, or a combination of both, wherein the first peak current is greater than the second peak current, and the first pulse width is greater than the second pulse width; and
      commanding the power conversion circuitry to transition the output of the welding-type power from the second pulse cycle to a third pulse cycle of the plurality of pulse cycles, wherein the third pulse cycle comprises a third peak current, a third pulse width, or a combination of both,
      wherein the third peak current is greater than the first peak current, or the third pulse width is greater than the second pulse width.

2. The welding-type system as defined in claim 1, wherein the control circuitry is further configured to control the power conversion circuitry to initiate the welding process by outputting the welding-type power as the first pulse cycle following clearance of a short circuit.

3. The welding-type system as defined in claim 1, the controller is configured to command the power conversion circuitry to transition from the first pulse cycle to the second pulse cycle after a predetermined duration.

4. The welding-type system as defined in claim 1, the controller is configured to command the power conversion circuitry to transition from the first pulse cycle to the second pulse cycle after a predetermined number of pulses.

5. The welding-type system as defined in claim 1, wherein the controller is configured to:
   monitor one or more output power parameters of the welding-type power during the first pulse cycle; and
   command the power conversion circuitry to output the welding-type power as the second pulse cycle based on the one or more output power parameters.

6. The welding-type system as defined in claim 5, wherein the one or more output parameters comprises a duration, a voltage, a current, or a temperature.

7. The welding-type system as defined in claim 1, wherein the first pulse cycle comprises a first frequency, a first background voltage and the first background current, and wherein the second pulse cycle comprises a second frequency different from the first frequency, a second background voltage different from the first background voltage, and a second background current different from the first background current.

8. The welding-type system as defined in claim 1, wherein the controller is configured to command the power conversion circuitry to terminate the welding process by transitioning the welding-type power from the second pulse cycle to the third pulse cycle.

9. The welding-type system as defined in claim 1, wherein the controller is configured to command the power conversion circuitry to discontinue output of the welding-type power after a predetermined duration of outputting the welding-type power as the third pulse cycle.

10. The welding-type system as defined in claim 1, wherein the third pulse cycle comprises a third frequency different from the second frequency, a third background voltage different from the second background voltage, and a third background current different from the second background current.

11. A method for pulse welding, the method comprising:
    controlling, via control circuitry, power conversion circuitry to convert input power to output welding-type power in a plurality of pulse cycles, each pulse cycle comprising a background portion, a ramp up portion, a peak portion, and a ramp down portion at a given polarity, wherein the controlling the power conversion circuitry comprises:
       commanding the power conversion circuitry to initiate a welding process by outputting the welding-type power as a first pulse cycle of the plurality of pulse cycles, wherein the first pulse cycle comprising a first peak current, a first background current, a first pulse width, or a combination thereof;
       commanding the power conversion circuitry to output the welding-type power as a second pulse cycle of the plurality of pulse cycles, wherein the second pulse cycle comprises a second peak current, a second pulse width, or a combination of both, wherein the first peak current is greater than the second peak current and the second peak current is greater than the first background current; and
       commanding the power conversion circuitry to transition the output of the welding-type power from the second pulse cycle to a third pulse cycle of the plurality of pulse cycles, wherein the third pulse cycle comprises a third peak current, a third pulse width, or a combination of both,
    wherein the third peak current is greater than the first second peak current, or the third pulse width is greater than the second pulse width.

12. The method as defined in claim 11, further comprising commanding the power conversion circuitry to terminate the welding process by transitioning the welding-type power from the second pulse cycle to the third pulse cycle.

13. The method as defined in claim 11, further comprising commanding the power conversion circuitry to discontinue output of the welding-type power after a predetermined duration of outputting the welding-type power as the third pulse cycle.

14. The method as defined in claim 11, wherein the first pulse width is greater than the second pulse width.

15. The method as defined in claim 11, further comprising transitioning from the first pulse cycle to the second pulse cycle after a predetermined duration.

16. The method as defined in claim 11, further comprising transitioning from the first pulse cycle to the second pulse cycle after a predetermined number of pulses.

17. The method as defined in claim 11, further comprising:
    monitoring one or more output power parameters of the welding-type power during the first pulse cycle; and commanding the power conversion circuitry to output the welding-type power as the second pulse cycle based on the one or more output power parameters.

18. The method as defined in claim 17, wherein the one or more output parameters comprises a duration, a voltage, a current, or a temperature.

19. The method as defined in claim 11, further comprising commanding the power conversion circuitry to initiate the welding process by outputting the welding-type power as the first pulse cycle following clearance of a short circuit.

20. A welding-type system, comprising:
power conversion circuitry configured to convert input power to welding-type power; and
control circuitry configured to control the power conversion circuitry to output the welding-type power in a plurality of pulse cycles, each pulse cycle comprising a background portion, a ramp up portion, a peak portion, and a ramp down portion, wherein the controlling the power conversion circuitry comprises:

commanding the power conversion circuitry to initiate a welding process by outputting the welding-type power as a first pulse cycle of the plurality of pulse cycles, wherein the first pulse cycle comprises a first peak current, a first pulse width, or a combination of both, and wherein the first pulse cycle comprises a polarity; and commanding the power conversion circuitry to output the welding-type power as a second pulse cycle of the plurality of pulse cycles, wherein the second pulse cycle comprises a second peak current, a second pulse width, or a combination of both, wherein the second pulse cycle comprises the polarity of the first pulse cycle, the first peak current is greater than the second peak current, and the first pulse width is greater than the second pulse width.

* * * * *